United States Patent
Adams (10) Patent No.: US 6,328,459 B1
(45) Date of Patent: Dec. 11, 2001

(54) RELEASABLE HOLDER

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 09/641,204

(22) Filed: Aug. 18, 2000

(51) Int. Cl.$^7$ ........................................ F21V 21/00
(52) U.S. Cl. ..................... 362/396; 362/457; 24/135; 174/74.2; 174/229.16
(58) Field of Search ........................ 362/396, 457, 362/249, 252, 581; 248/50, 55, 60, 62, 68.1, 172, 218.4, 219.1, 74.1, 74.2, 229.16, 229.26; 24/336, 339, 545, 555; 174/135, 40 CC, 168, 163 R (56) References Cited

U.S. PATENT DOCUMENTS

| | | | |
|---|---|---|---|
| D. 356,246 | 3/1995 | Adams | D26/138 |
| D. 356,492 * | 3/1995 | Adams | D8/395 |
| D. 406,383 | 3/1999 | Adams | 248/231.81 |
| 1,858,656 | 5/1932 | Batherman | 248/210 |
| 1,895,656 | 1/1933 | Gadke | 248/229.26 |
| 2,782,296 | 2/1957 | Walter | 362/392 |
| 3,540,687 | 11/1970 | Cava | 248/223.41 |
| 4,407,472 * | 10/1983 | Beck | 248/89 |
| 4,851,977 | 7/1989 | Gary | 362/249 |
| 4,901,212 | 2/1990 | Prickett | 362/145 |
| 4,905,131 | 2/1990 | Gary | 362/249 |
| 5,056,198 | 10/1991 | Viglione | 24/336 |
| 5,141,192 | 8/1992 | Adams | 248/231.81 |
| 5,209,441 * | 5/1993 | Satoh | 248/74.2 |
| 5,555,607 | 9/1996 | Parveris | 24/129 R |
| 5,667,174 | 9/1997 | Adams | 248/231.81 |
| 5,669,709 | 9/1997 | Adams | 362/396 |
| 5,772,166 | 6/1998 | Adams | 248/231.81 |
| 6,109,569 * | 8/2000 | Sakaida | 248/75 |

FOREIGN PATENT DOCUMENTS

2080676 * 2/1982 (GB) .

* cited by examiner

*Primary Examiner*—Alan Cariaso
*Assistant Examiner*—Hargobind S. Sawhney
(74) *Attorney, Agent, or Firm*—Buchanan Ingersoll, P.C.

(57) ABSTRACT

A holder for holding decorative lights and other objects having a generally cylindrical portion has a holding segment containing two curvilinear arms and a mounting segment to attach the holder to a mounting surface. The holding segment has a first curvilinear portion and a second curvilinear portion extending from the mounting. The first curvilinear portion is sized and shaped to define a generally cylindrical opening having a first selected diameter. The second curvilinear portion is sized and shaped to define a second generally cylindrical opening having a second selected diameter that is larger than the first selected diameter. Additionally, the end of the second curvilinear portion is adjacent the end of the first curvilinear portion. The curvilinear portions are sized and sufficiently flexible to hold within the cylindrical opening defined by the first curvilinear portion an object having a diameter larger than the first diameter but not larger than the second diameter while the second end abuts the first curvilinear portion. This results in both arms being flexed when the object is inserted and both arms exerting a force against the object being held.

16 Claims, 6 Drawing Sheets

RELEASABLE HOLDER

FIELD OF THE INVENTION

The invention relates to mounting clips for attaching decorative lights to various structures and for holding other objects that contain a generally cylindrical body or body portion.

DESCRIPTION OF THE PRIOR ART

The use of lights for decorating the exterior of a house is well known. Decorative lights typically consist of a large number of light sockets being wired together with light bulbs positioned in the light sockets. The "string" of lights is then attached to the face of a building. The "string" of lights can be mounted by retaining either the light socket or the wire. My mounting clip is concerned with a holder that retains the light socket, although it can also retain the wire as well as hold rope lights and icicle lights.

The object of these holders is to display the lights so that they can easily be seen. The holders must not be adversely affected by cold temperatures and should be able to hold the lights during high winds which commonly accompany winter storms.

Further, most prior art light mountings which grasp light sockets only accept one size light. However, there are three sizes of outdoor lights which are commonly displayed. Because the prior art mountings accept only one size light an entire new mounting would be necessary if a different size light is to be displayed.

Some prior art light mountings attach lights permanently to a structure. By permanently attaching the mountings to a house frame, gutter or other surface, the surface is marred permanently. Because decorative lighting is seasonal the lights are usually removed after the holidays at which time the marred surface is exposed.

One type of conventional, permanent light mounting is a two-piece rigid configuration comprising a base portion and a light socket retainer. The base portion is in the form of an L-shaped configuration. One leg of the L-shape base portion is permanently mounted to a relatively flat surface of a house such as a window frame. The other leg of the L-shape is a channel member having flanges on opposite sides which accommodate the light socket retainer. The light socket retainer slides into the channel member. The light socket retainer has two resilient clamp members which grasp a light. This type of light mounting is described in U.S. Pat. No. 3,540,687.

Another prior art device provides an L-shaped light support bracket with one of the legs being fitted under a shingle. The other leg includes a hole sized to receive a light bulb. This type of light support bracket can also be positioned within a retaining strip which is permanently attached to a flat building surface. Examples of these light mountings are shown in U.S. Pat. Nos. 4,905,131; 4,901,212; and 4,851,977. And has been sold under the trademark "LITES UP" by Gary Products Group, Inc. This type of mounting is easy to dislodge and frequently will come loose during winter storms.

Other related art devices concern mounting electric lights on Christmas trees. One such device comprises a spring-biased H-shaped clip having a cylindrical light socket attached to the top of the clip. Multiple clips are connected together by insulated electrical wire. A light bulb is placed in each of the light sockets and the string of electrical wire is positioned on a Christmas tree wherein each clip attaches a light to a branch of the Christmas tree.

Another device for mounting light bulbs to Christmas trees provides a resilient clamp which grips the light bulb and spring fingers extending perpendicularly from the resilient clamp which grasps a tree limb. Examples of light mountings for attaching lights to Christmas tree branches are illustrated in U.S. Pat. Nos. 2,782,296 and 1,895,656. This type of mounting is relatively expensive and more difficult to make than my mounting clip.

In my U.S. Pat. No. 5,772,116 a mounting clip is disclosed which has a mounting for attachment to a shingle or siding and a light holder portion which holds the socket of a decorative light. Various configurations of light holders are disclosed, ranging from U-shapes, to C-shapes which define a circular opening smaller than the socket of a decorative light. The curvilinear portion is flexed to expand the opening and receive the decorative light socket and then close and grip the socket. One problem with this structure is that the curvilinear portion tends to lose its memory over time or after repeated insertion and removal of the decorative light socket. When that occurs the curvilinear portion does not fully close and the light socket is easily dislodged from the holder. This problem can be alleviated to some extent by selecting a different plastic or metal, enlarging the curvilinear portion to include more plastic or by providing reinforcing ribs. However, all of these solutions increase the cost of the holder. Thus, there is a need for a flexible plastic or metal holder for decorative lights that can be used repeatedly without losing its ability to tightly grip the light socket.

SUMMARY OF THE INVENTION

I provide a holder for holding decorative lights and other objects having a generally cylindrical portion that has a holding segment containing two curvilinear arms and a mounting segment to attach the holder to a mounting surface. The holding segment has a first curvilinear portion or arm and a second curvilinear portion or arm extending from the mounting. The first curvilinear portion is sized and shaped to define a generally cylindrical opening having a first selected diameter. The second curvilinear portion is sized and shaped to define a second generally cylindrical opening having a second selected diameter that is larger than the first selected diameter. Additionally, the end of the second curvilinear portion is adjacent the end of the first curvilinear portion. The curvilinear portions are sized and sufficiently flexible to hold within the cylindrical opening defined by the first curvilinear portion an object having a diameter larger than the first diameter but not larger than the second diameter while the second end abuts the first curvilinear portion. This results in both arms being flexed when the object is inserted and both arms exerting a force against the object being held.

The mounting portion can be variously configured to be attached directly to a mounting surface or attached to another product such as a suction cup, magnet or stake.

The holding portion can be any desired size. I prefer to size the arms to hold all sizes of decorative lights.

DESCRIPTION OF THE PREFERRED EMBODIMENTS

A first present preferred embodiment of my holder 1 shown in FIGS. 1 through 8 has an elongated flexible body 2. The body has a first curvilinear portion 4 that terminates in a first end 11 and a second curvilinear portion 6 that extends from the first curvilinear portion 4 to a second end 12. These two curvilinear portions or arms form the holding portion of the holder. The body has an interior surface 5 and an exterior surface 7. A mounting 8 extends from the exterior surface 7 and is shaped to fit onto a mounting clip such as mounting clip 30 shown in FIG. 6. In the relaxed position where the holder is not holding an object the second end 12 is opposite the first curvilinear portion 4. That end 12 may abut the first curvilinear portion 4 or be spaced apart from it.

Figure 1:
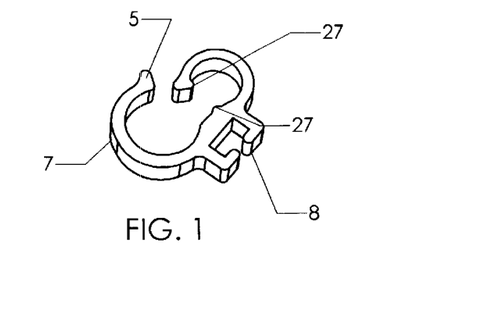
FIG. 1 is a perspective view of a first present preferred embodiment of my holder for decorative lights and other objects having a generally cylindrical body portion.
Figure 2:
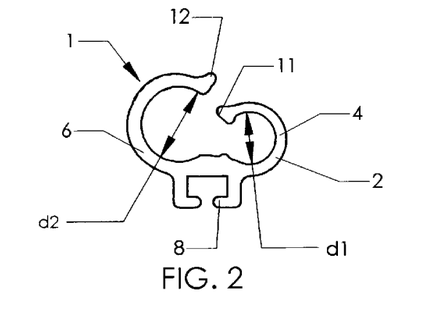
FIG. 2 is a top plan view of the holder of FIG. 1.
Figure 3:
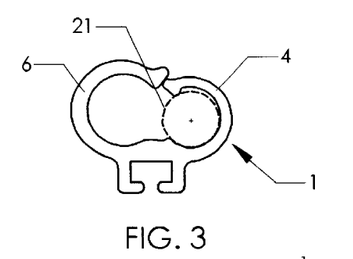
FIG. 3 is a top plan view similar to FIG. 2 with the holder in a flexed position holding object indicated in chain line.

Referring to FIG. 2, the first curvilinear portion defines a circular opening 14 having a first diameter $d_1$. The second curvilinear portion defines a second opening 16 having a second diameter $d_2$. The second diameter $d_2$ is larger than $d_1$. In an embodiment of the holder intended to be used to hold decorative lights, diameter $d_2$ is 5/16 inches, slightly smaller than the diameter of the socket for a mini-light bulb. The second diameter $d_2$ is 7/16 inches which is slightly smaller than the diameter of the socket that holds a C-7 light bulb. When a mini-light socket, indicated in chain line by circle 21 in FIG. 3, is placed in the holder, the first curvilinear portion 4 is flexed outward and then retracts to encircle and grip the socket. The second curvilinear portion 6 is sized and configured to press against the first curvilinear portion 4. This configuration provides additional force to grip the mini-light socket. Consequently, the first curvilinear portion will retain its memory for a longer period of time than would occur if the second curvilinear portion did not engage the first curvilinear portion.

Figure 4:
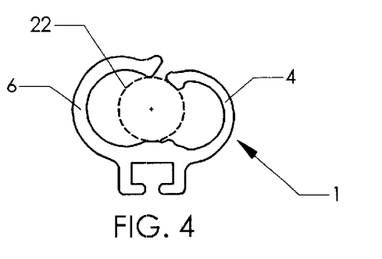
FIG. 4 is a top plan view similar to FIG. 2 with the holder in a flexed position holding a second object indicated in chain line.
Figure 5:
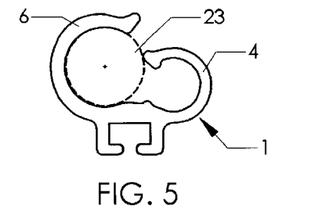
FIG. 5 is a top plan view similar to FIGS. 3 and 4 with the holder in a flexed position holding a third object indicated in chain line.

When larger sockets are held by the holder both curvilinear portions 4 and 6 will engage the socket as shown in FIGS. 4 and 5. The position of a socket for a C-7 bulb is held as indicated by circle 22 in FIG. 4. A larger C-9 bulb is positioned in the location of circle 23 in FIG. 5. Both the first curvilinear portion 4 and the second curvilinear portion 6 press against the C-7 socket and the C-9 socket shown in the figures.

To provide better gripping I prefer to place nubs or nodules 27 on the interior surface 5 of the body. That surface could also be roughened or contain teeth or ribs.

Figure 6:
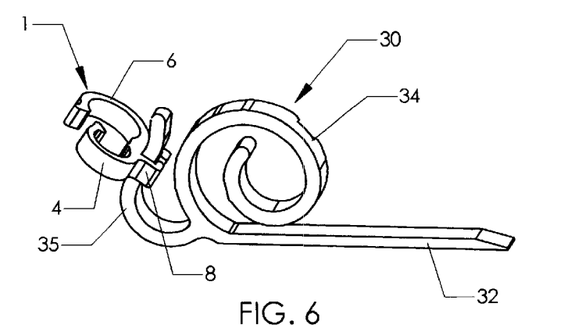
FIG. 6 is a perspective view showing the first present embodiment attached to a mounting clip.

The first preferred embodiment of the holder has a mounting portion 8 that is configured for attachment to a mounting clip 30 as shown in FIG. 6. Similar mounting clips are disclosed in my U.S. Pat. Nos. 5,669,709 and 5,772,166. Those patents also describes how the mounting clip can be attached to a shingle or gutter. The mounting clip 30 has a base member 32 that can be inserted between overlapping shingles or siding on a building. There is also a spiral hook portion 34 which fits over a lip of a gutter and a finer 35 on front of the spiral 34. The mounting can be positioned on the finger 35 as shown or along the spiral. One advantage of this configuration is that decorative light bulbs can be held a sufficient distance from vinyl siding so that the heat from the bulb does not melt or discolor the siding. Discoloration and marring has occurred when such bulbs have been held against or very close to vinyl siding by other mounting clips.

Figure 7:
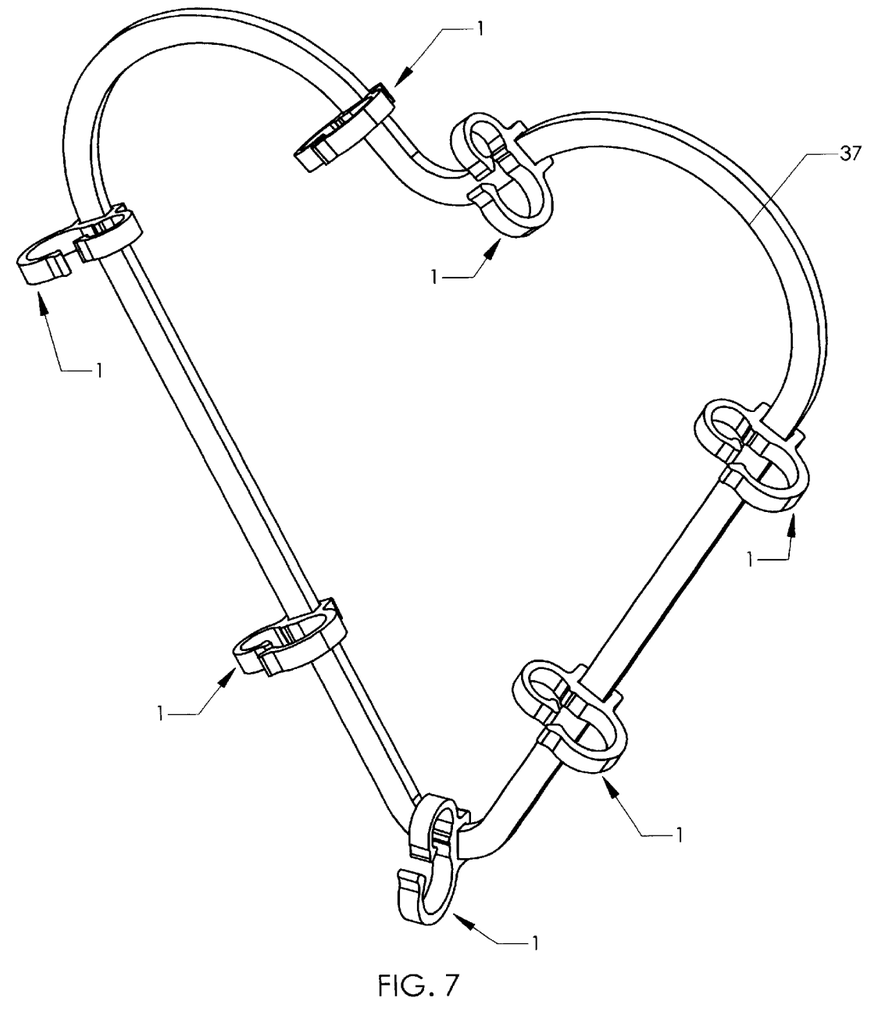
FIG. 7 is a perspective view showing the holders mounted on a flat, heart shaped frame.
Figure 8:
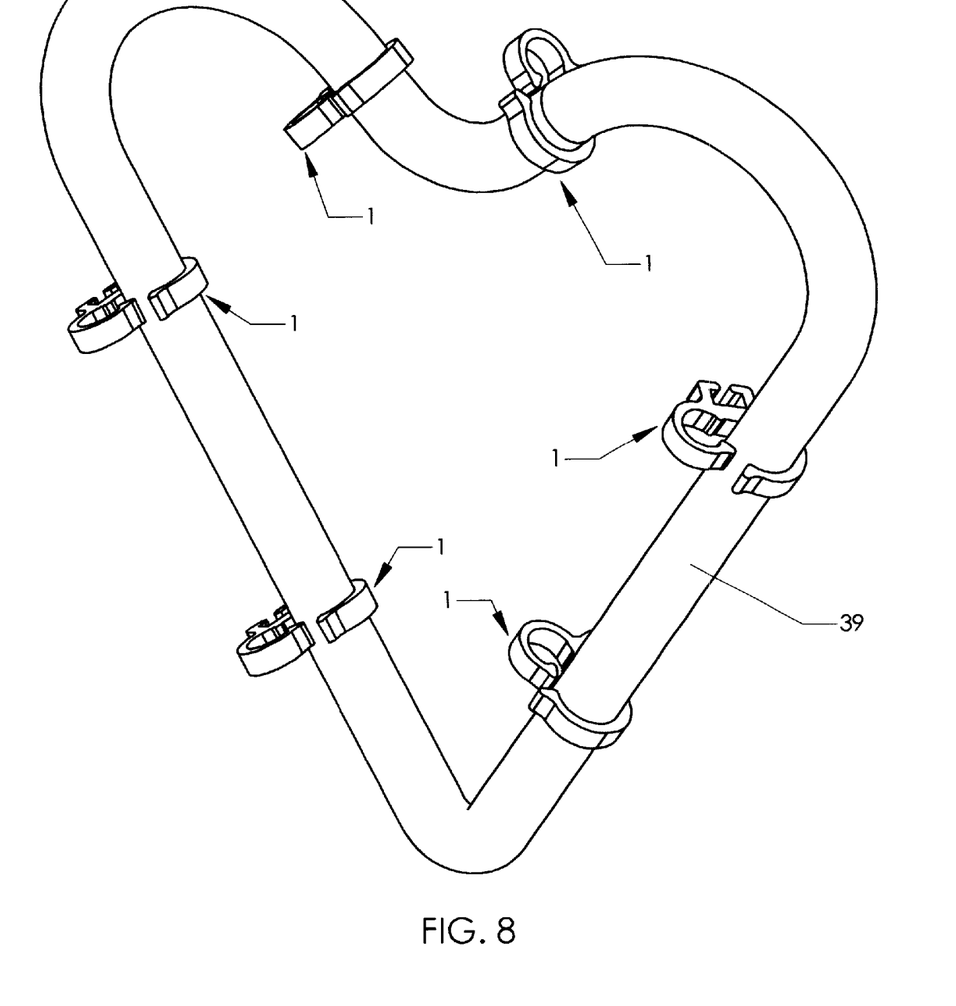
FIG. 8 is a perspective view of the holders attached to a heart shaped tubular structure that may be an illuminated tube.

The holder could be mounted on a flat frame constructed to have a decorative shape such as a heart-shape frame 37 shown in FIG. 7. Then a string of decorative lights could be held in the holder. The frame 37 could be purely decorative or surround a sign or other object (not shown) within the frame that is illuminated by lights held in the frame 37. Although the frame shown in FIG. 7 is very simple, other more complex shapes could be used. The holder and frame shown in FIG. 7 could hold a similarly shaped tube 39 shown in FIG. 8. That tube could be a fluorescent tube.

Figure 9:
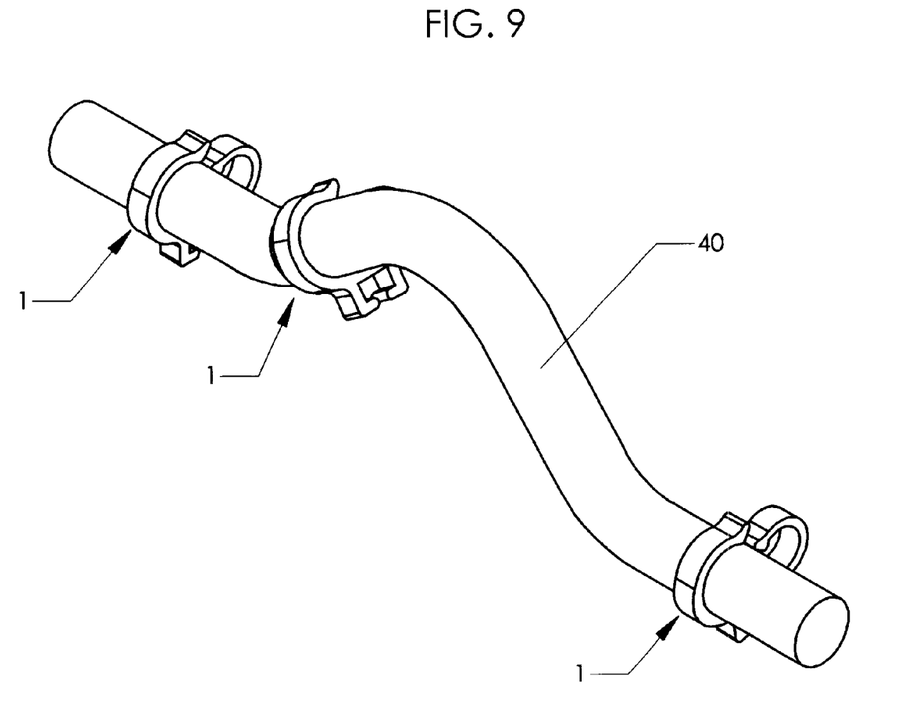
FIG. 9 is a perspective view of a segment of rope lights being held by three holders.

In recent years rope lights and icicle lights have become popular. Both types of lights have generally cylindrical portions. In rope lights there are tubes in which mini-lights are contained. Icicle lights may have a frame on which mini-lights are attached or they may be simply a pattern of cords and lights that hang like icicles. As shown in FIG. 9, the present holder 1 can be used to hold the cylindrical portion 40 of a rope light as well as the frame or cord of icicle lights. Furthermore, the tubular structure in FIG. 8 could be a string of rope lights. It should therefore be apparent from FIGS. 1 through 9 that the present holder can support all types of decorative lights currently available in the marketplace.

Figure 10:
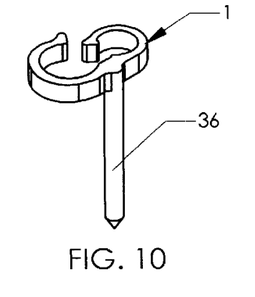
FIG. 10 is a perspective view of a second present preferred embodiment of my holder.
Figures 11, 12, 13, 14:
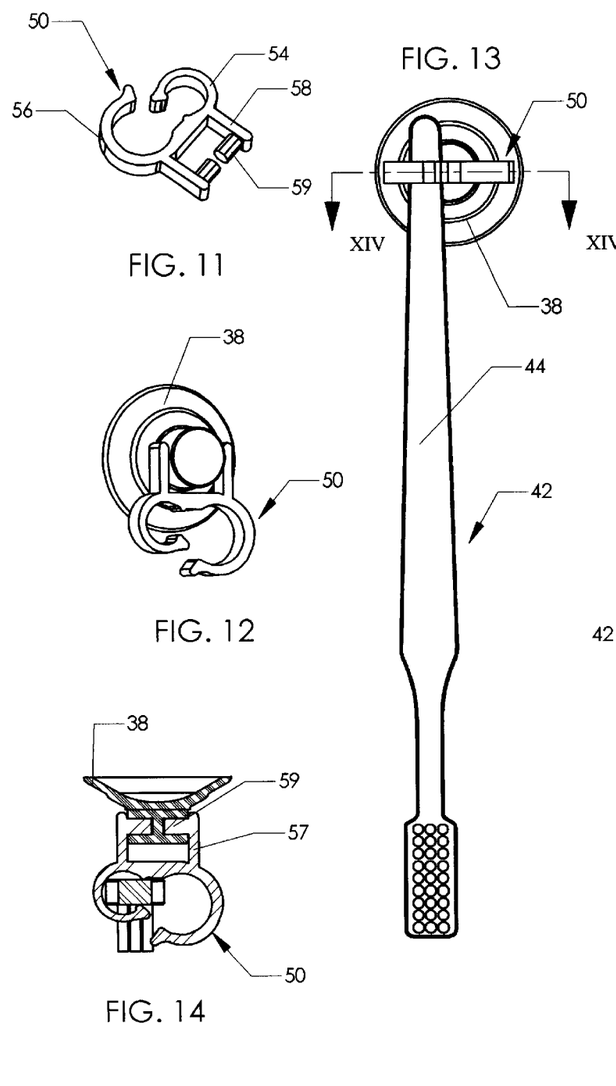
FIG. 11 is a perspective view of a third present preferred embodiment of my holder.
FIG. 12 is a perspective view of the holder shown in FIG. 11 attached to a suction cup and in a retracted position.
FIG. 13 is a front view of the holder of FIG. 9 in an extended position holding a toothbrush near the bottom of the handle.
FIG. 14 is a top view taken along the line XIV—XIV in FIG. 13.
Figure 18:
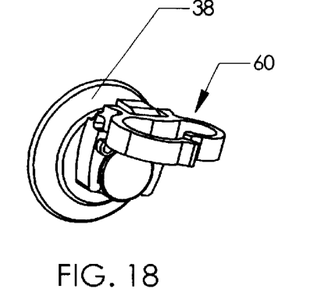
FIG. 18 is a perspective view showing the folded holder of FIG. 17 attached to a suction cup.
Figures 19, 20:
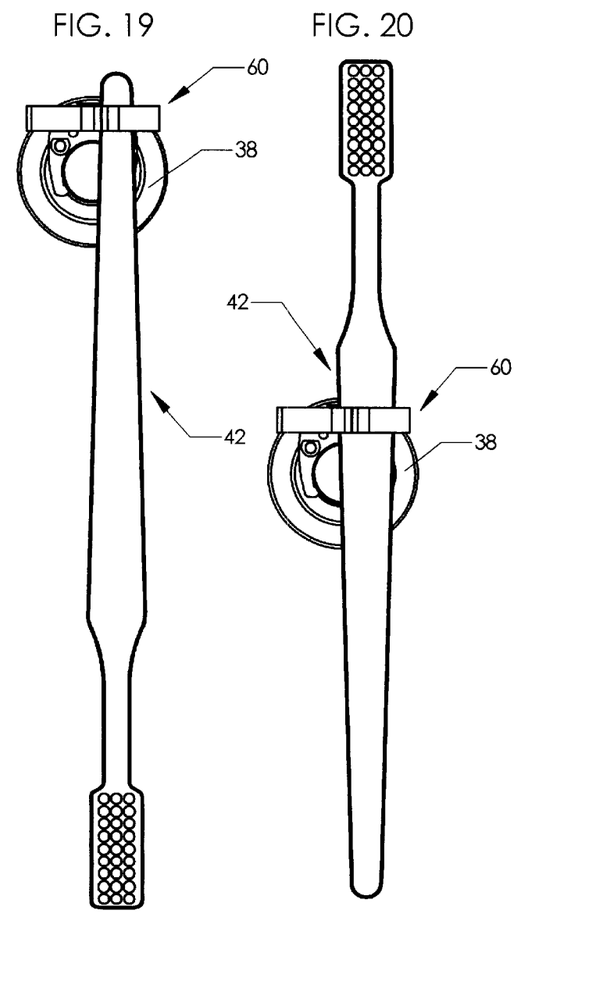
FIG. 19 is a front view of the holder of FIG. 18 holding a toothbrush near the bottom of the handle.
FIG. 20 is a front view similar to FIG. 19 showing the toothbrush being held at the widest part of the handle.

The present holder can have other types of mountings such as a stake 36 or a suction cup 38 shown in FIGS. 10, 12 and 18. The stake 36 may be very short or several feet long and may be oriented perpendicular to the body as shown, or coplanar with the body or at any other desired angle relative to the body. The stake 36 could be sized to be inserted into the head of a suction cup 38 to create a structure similar to the embodiment shown in FIG. 18.

Referring now to FIGS. 11 through 15 a third present preferred embodiment 50 has the same arms 54 and 56 but a different mounting 58. This mounting 58 has two parallel arms 57 each having a pin 59 extended toward the opposite arm. The arms have a hexagonal cross section. As can be seen in FIGS. 12 through 15 the pins 59 fit within holes having a hexagonal cross section cut into the head of suction cup 38. Consequently, the holder can be positioned in a retracted position shown in FIG. 12 or the extended position shown in FIGS. 13 through 15. The holder is retracted for packaging and storage and extended for use.

Figure 15:
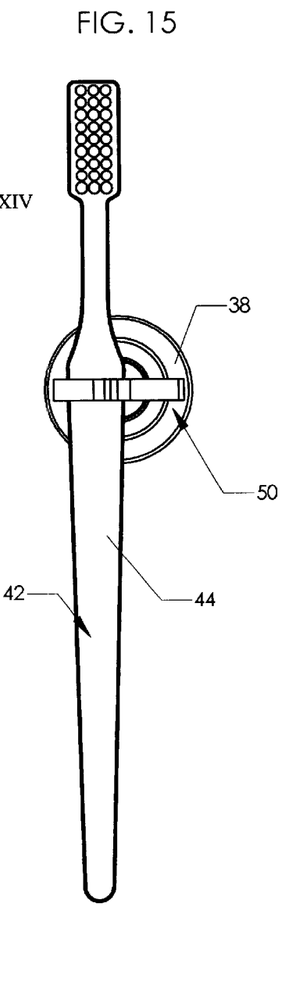
FIG. 15 is a front view similar to FIG. 13 showing the toothbrush being held at the widest part of the handle.

The present holder is not limited to holding decorative lights but can be used to hold other lightweight objects having a generally cylindrical body portion. For example, all sizes of pens, pencils and markers can be held. The holder can also be used to hold cables, pipes, romex wiring, wire bundles and fishing rods. Larger holders could hold cups and soft drinks. As shown in FIGS. 13, 14 and 15, the holder is particularly useful as a toothbrush holder.

A toothbrush has an elongated body which serves as a handle and bristles at one end of the body. As shown in FIGS. 13, 14 and 15, the handle 44 of a toothbrush 42 is typically not cylindrical but has a rectangular or elliptical cross section. The width varies along the length of the handle. Nevertheless, the handle can be considered to be a generally cylindrical structure. Consequently, the handle can be inserted into the holder and held in any desired orientation. I prefer to retain the toothbrush, bristles down with the holder gripping the narrow base or other part of the handle as shown in FIG. 13. That position is more sanitary than allowing the bristles to rest on the top of the holder. Obviously, the toothbrush could be held horizontally or in any other desired orientation. The same holder can also grip the widest portion of the toothbrush as shown in FIG. 15. In the embodiment shown in FIGS. 13 and 15, the toothbrush holder includes a suction cup 38. However, magnets and other types of mountings could be used. It should be apparent from FIGS. 13 and 15 that the holder could also be used to hold a razor and other utensils having an elongated handle.

Figure 16:
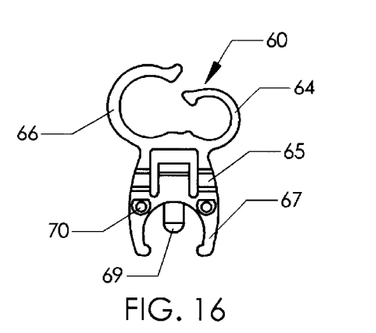
FIG. 16 is a front view of a fourth present preferred embodiment of my holder.
Figure 17:
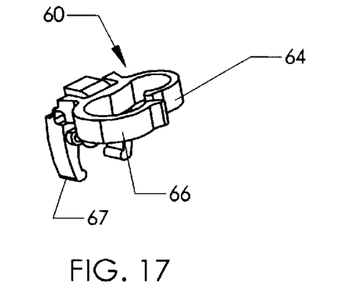
FIG. 17 is a perspective view showing the holder of FIG. 16 in a folded position.

Another embodiment of my holder 60 is shown in FIGS. 16 through 20. That holder has similar arms 64 and 66 that are attached to a folding mounting 58. This mounting has two parallel arms 67 and a parallel pin 69 between the arms. The pin fits within a hole in the head of a suction cup 38 while the arms 69 surround the head. Holes 70 are provided to enable the holder 60 to be attached to a flat surface by nails or screws. Alternatively, an adhesive or double-coated tape could be used. A hinge 65 is provided to allow the arms 67 and pin 69 to be flexed from a position coplanar with the holder arms 64 and 66 to a position perpendicular to those arms as shown in FIGS. 16 and 17, respectively. Like the embodiment in FIGS. 11 through 15, this holder can be packaged in a flat or retracted position then folded for use to hold objects such as the toothbrush 42 shown in FIGS. 19 and 20.

Because the holder can hold objects having a wide range of diameters, it can be used throughout the home and office. In addition to holding razors and toothbrushes in the bathroom, it could be used hold pencils or pens and computer or telephone cables in the den or office. Moreover, two objects of different sizes could beheld simultaneously one in each arm. For example, a two inch pipe could be held in the smaller arm while a four-inch pipe rests within the larger arm.

The use of different mountings permits the holder to be held on virtually any surface. A suction cup can be used for glass and other smooth surfaces. A magnet permits attachment to metal. Stakes can be provided to mount the holder in the ground or other soft surfaces.

The holder can be made of any flexible material including some plastics and metals, but I prefer to mold it from a polycarbonate. The holder is configured so that it can be easily molded using a two piece mold. It is also possible to extrude the holder using the method described in my U.S. Pat. No. 5,669,709.

Although I have illustrated and described certain present preferred embodiments of my holder, it should be distinctly understood that the invention is not limited thereto, but may be variously embodied within the scope of the following claims.

I claim:

1. A holder for holding objects having a generally cylindrical portion having a diameter larger than a first selected diameter comprising:

a. an elongated flexible body having a first end, a first curvilinear portion extending from the first end, a second curvilinear portion extending from the first curvilinear portion and terminating in a second end wherein:

the first curvilinear portion is sized and shaped to define a generally cylindrical opening having a first selected diameter;

the second curvilinear portion is sized and shaped to define a second generally cylindrical opening having a second selected diameter that is larger than the first selected diameter, the first curvilinear portion and the second curvilinear portion defining a single continuous area;

the second end is adjacent the first curvilinear portion; and the curvilinear portions being sized and sufficiently flexible to hold within the cylindrical opening defined by the first curvilinear portion an object having a diameter larger than the first diameter but not larger than the second diameter while the second end abuts the first curvilinear portion; and b. a mounting extending from the elongated flexible body.

2. The holder of claim 1 wherein the objects are decorative lights each having a socket and the first selected diameter is smaller than a diameter of the socket.

3. The holder of claim 1 wherein the mounting is a stake.

4. The holder of claim 1 wherein the mounting is a clip.

5. The holder of claim 1 wherein the mounting is a suction cup.

6. The holder of claim 1 also comprising at least one nub attached to at least one of the first curvilinear portion and the second curvilinear portion.

7. The holder of claim 1 wherein the first diameter is 5/16 inches and the second diameter is 7/16 inches.

8. The holder of claim 1 wherein the curvilinear portions are sized to hold a handle portion of a toothbrush while bristles of the toothbrush are not in contact with the curvilinear portions.

9. The holder of claim 1 wherein the curvilinear portions are sized to hold at least one cable selected from the group consisting of electrical cables, fiber-optic cables and telephone cables.

10. The holder of claim 1 wherein the holder is comprised of polycarbonate.

11. The holder of claim 1 also comprising a hinge connected between the holding portion and the mounting.

12. The holder of claim 11 wherein the mounting is comprised of a pair of spaced apart parallel arms.

13. The holder of claim 12 wherein the mounting also comprises a pin positioned between the parallel arms.

14. The holder of claim 1 wherein the mounting is comprised of a pair of spaced apart parallel arms.

15. The holder of claim 14 wherein the mounting also comprises a pin attached to each of the parallel arms and facing the other parallel arm.

16. The holder of claim 15 wherein the pins have a hexagonal cross-section.

* * * * *